April 18, 1950        W. I. BENDZ        2,504,105
VARIABLE VOLTAGE DRIVE
Filed May 13, 1947
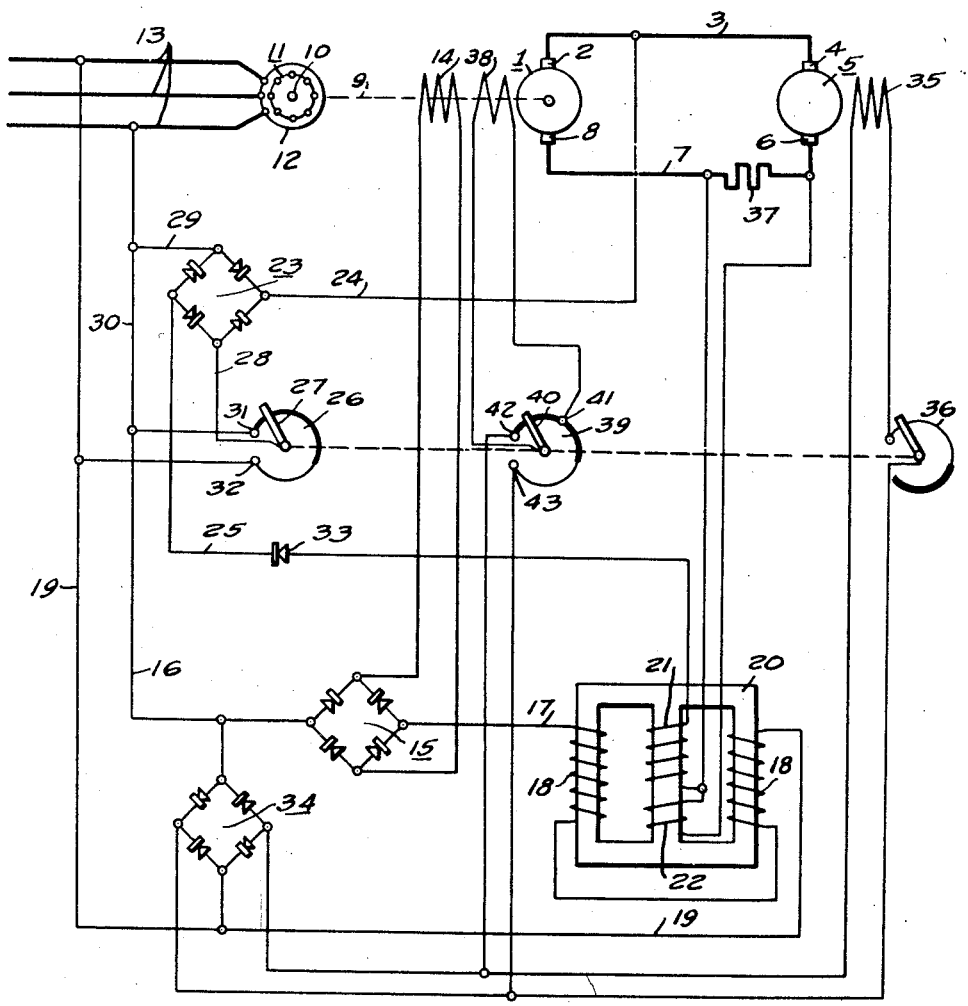
WITNESSES:
INVENTOR
Waldemar I. Bendz.
BY
Paul E. Friedemann
ATTORNEY Patented Apr. 18, 1950

2,504,105

UNITED STATES PATENT OFFICE 2,504,105

VARIABLE VOLTAGE DRIVE

Waldemar I. Bendz, Weston, Mass., assignor to Westinghouse Electric Corporation, East Pittsburgh, Pa., a corporation of Pennsylvania Application May 13, 1947, Serial No. 747,785

9 Claims. (Cl. 318—143)

1

This invention relates to a control system and voltage regulating apparatus for a variable speed drive of the type in which two direct-current dynamo electric machines have their armatures connected in series and in which one of the machines is operated as a generator to supply a variable voltage to the other of the machines which is operated as a variable speed motor.

Variable speed drives of the type referred to are well known and have considerable use because of their overall operating efficiency and the wide range of speed that can be provided thereby. One of the factors limiting the range of speed provided by this type of drive is the instability and poor regulation which is had at the lower speed range. This is due to the fact that the IR drop across the motor at the lower speed range rises to a considerable proportion of the output voltage of the generator, thus making regulation of the motor speed difficult. In one of its aspects, this invention contemplates an improved arrangement of control by which the voltage of the generator is regulated to compensate for the IR drop across the motor in such manner as to reduce the lower speed limit of the motor and thereby increase the overall operating speed range of such motor. In another of its aspects, this invention contemplates the provision of an improved arrangement of control for controlling the voltage of the generator over the entire motor speed range. As will become apparent during the course of the following description, the control comprises a voltage regulator which is extremely sensitive in its response to the electrical condition of the voltage being regulated and may have use in apparatus other than a variable speed drive of the type referred to.

In the accompanying drawing there is illustrated diagrammatically a preferred embodiment of the invention. In this showing only those parts of the control apparatus necessary to an understanding of the invention have been illustrated, and it is to be understood that in actual practice conventional starting mechanism and controls customary in the art will be provided.

Referring to the drawing, the numeral 1 designates a direct-current dynamo-electric machine having one terminal 2 of its armature connected by a lead 3 to the armature terminal 4 of a direct-current dynamo electric machine 5. The other terminal 6 of the machine 5 is connected by a lead 7 to the armature terminal 8 of the machine 1. The machine 1 is operated as a direct-current generator and has its armature mechanically connected, as diagrammatically indi-

2 cated by the broken line 9, to the rotor 10 of an alternating-current motor 11. The stator 12 of the motor 11 has its windings connected to a polyphase source of alternating current by the alternating-current buses 13. The armature of the generator 1 is thus driven by the motor 11 and its output voltage is varied by varying the excitation of a control field winding 14 in a manner to be described.

The winding 14 has its terminals connected to the direct-current output terminals of a rectifier 15. The rectifier 15 has one of its input terminals connected by a lead 16 to one of the buses 13 and its other input terminal connected by a lead 17, coils 18 and a lead 19 to another one of the alternating-current buses 13. The coils 18 are wound on the legs of an iron core reactor 20. The current fed to the control winding 14 by the rectifier 15 is thus controlled by the impedance offered by the coils 18 in the alternating-current input circuit of the rectifier 15. The impedance of the coils 18 is a measure of the reactance of the reactor 20 which is controlled by direct-current saturating windings 21 and 22. When the windings 21 and 22 operate to saturate the reactor 20, the reactance of the reactor 20 and the impedance of the coils 18 will be a minimum, thereby providing maximum alternating input current to the rectifier 15 and maximum energization of the control winding 14.

The current flowing in the control winding 21 and thereby the energization of the generator field winding 14 is a measure of the difference of the voltage in the output circuit of the generator 1 and the voltage in the direct-current output circuit of a pilot rectifier 23. The pilot rectifier 23 has one of its direct-current output terminals connected by a lead 24 to the lead 3 on one side of the generator 1 and its other output terminal connected by a lead 25 and the coil 21 to the lead 7 on the other side of the generator 1. The polarities of the connections of the pilot rectifier 23 with respect to the generator 1 are made in such manner that the output of the pilot rectifier 23 is connected in series opposition to the output of the generator 1, and the current flowing in the coil 21 is a measure of the difference of such output voltages.

The alternating-current input to the pilot rectifier 23 is controlled by an adjustable rheostat 26 which has its slide contact 27 connected by lead 28 to one input terminal of the rectifier 23. The other input terminal of the rectifier 23 is connected by a lead 29 and a lead 30 to one of the buses 13. The resistance terminal 31 of the rheostat 26 is connected to the alternating-current lead 30, and the other resistance terminal 32 is connected to the alternating-current lead 19. In this manner the rheostat 26 provides an adjustable amount of resistance in parallel with the input terminals to the pilot rectifier 23. By reason of this connection it will be seen that the alternating current fed to the pilot rectifier 23 will increase as the slide contact 27 is moved away from the stationary terminal 31 to increase the resistance between the terminal 31 and the slide contact 27. Movement of the slide contact 27 in a clockwise direction thus increases the output voltage of the pilot rectifier 23.

Adjustment of the rheostat 26 controls the output voltage of the generator 1. This control action will be best understood by considering the operation of the apparatus as it starts from rest. When the motor 11 is started by the conventional starting apparatus (not shown), the output voltage of the generator 2 is at a minimum, and the full output voltage of the rectifier 23 is available to energize the winding 21. The winding 21 under such conditions will saturate the reactor 20 and the rectifier 15 will then operate to provide maximum energization of the control field 14. The voltage of the generator 2 will then build up rapidly, and as the generator voltage increases it will oppose the output of the pilot rectifier 23, and the current flowing in the winding 21 will be reduced accordingly. The increasing generator voltage thus cuts down the saturation of the reactor 20 and increases the impedance offered by the coils 18 in the input circuit of the rectifier 15 to reduce energization of the winding 14. The apparatus is so designed that this action will continue until a balanced condition is reached with the output of the generator 1 slightly less than the output of the pilot rectifier 23. If, after a balanced condition is reached, the rheostat 26 is adjusted to increase the output of the pilot rectifier 23, the output of the generator 2 will be increased accordingly. In the event that the voltage of the generator 2 varies without adjustment of the rheostat 26, it will be apparent that the apparatus thus far described is effective to regulate for such voltage variation and increase or decrease the output of the generator 2 according to the conditions called for.

With respect to the regulation provided by the pilot rectifier 23, reactor 20 and associated parts, attention is particularly invited to the fact that the apparatus provides a multiplied corrective factor for a given voltage variation. Assuming the output of the rectifier 23 to be 110 volts when the output of the generator 1 has an output of 100 volts, it will be seen that a difference of approximately 10 volts is available for energization of the winding 21 to maintain the output of the generator 2 at 100 volts. Assuming a variation of one volt in the output voltage of the generator 2 under these conditions, it will be seen that the voltage difference applied to the coil 21 will be increased or decreased by approximately 10 per cent, and the corrective regulating factor applied will be 10 times that of the voltage variation. By designing the apparatus so that a balance is obtained with a difference in such voltages of less than 10 volts as assumed above, the corrective factor can still further be increased. It will thus be seen that the employment of the rectifier 23 with its output differentially related to the output of the generator 1 provides an extremely sensitive voltage regulation of the output of the generator 1.

Since the coil 21 is not sensitive to the direction of current flow, a rectifying valve 33 is connected in the lead 25 to prevent any current flowing through the coil 21 at such times when the voltage output of the rectifier 23 is less than the voltage output of the generator 1. Under normal conditions the output voltage of the rectifier 23 will always be greater than the output voltage of the generator 1. However, under abnormal conditions, such as the sudden removal of the load on the generator 1 or sudden reduction called for by moving slider 27 toward terminal 31, there may be a momentary rise in the output voltage of the generator 1 to an extent where it may exceed the output voltage of the rectifier 23. The rectifier valve 33 in such case will be effective to prevent any flow of current through the coil 21 and consequent energization of the field winding 14 in a direction to maintain the abnormal output of the generator 2. Although the rectifier 23 will of itself prevent a reverse current flow, the rectifier valve 33 will be essential in case a different type of variable direct-current source is substituted for the rectifier 23.

A rectifier 34 has its alternating-current input terminals connected to the leads 16 and 19, and its direct-current output terminals connected across a field winding 35 for the motor 5. An adjustable rheostat 36 is connected in the circuit to the motor field 35 for the purpose of reducing the excitation of such field at the higher motor speeds, full excitation of the field 35 being provided over the lower range of speeds. The rheostat 36 is mechanically connected to the rheostat 26 and is arranged in such manner that the excitation of the field 35 is not varied while the rheostat 26 is being operated to increase the output voltage of the generator 1. When the rheostat 26 has moved far enough in a clockwise direction to remove all its resistance from the circuit of the rectifier 23, the output voltage of the generator 1 will be a maximum. Further increases in the speed of the motor 5 may then be had by continued rotation of the rheostats 26 and 36 to insert resistance in the circuit to the motor field 35 for the purpose of decreasing the strength of such field.

The control coil 22 mentioned previously is connected across a dropping resistor 37 connected in series with the lead 7. The voltage drop across the resistor 37 is proportional to the armature current flowing in the motor 5 and is a measure of the IR drop in such motor. For a given voltage between terminals 2 and 8 of generator 1, an increase in loading of the motor 5 can be had only by a decrease in the back E. M. F. of the motor, and because the back E. M. F. is proportional to speed, the increased loading can only be had by a reduction in the operating speed. The reduction in back E. M. F. will thus be accompanied by an increase in the armature current and an increase in the voltage drop across the resistor 37. This increased voltage drop will increase the energization of the coil 22 and vary the reactance of the reactor 20 to increase the energization of the winding 14 and output voltage of the generator 1 an amount sufficient to raise the terminal voltage 2—8 of the generator by an amount equal to the increased IR drop (in the motor armature) and restore the back E. M. F. of the motor 5 to its value prior to the increased loading. Upon return of the back E. M. F. to its value prior to the increased loading, the speed of the motor 5 will have been returned to the speed which it had previously. The compensation for the IR drop provided by the resistor 37 and coil 22 is very important at low speeds of operation when the IR drop constitutes a considerable proportion of the load on the generator 1. By reason of the provision of the coil 22, the speed regulation provided at the lower range of speed is considerably improved and lowered to thereby increase the overall speed range of the motor 5.

To reduce the minimum output voltage of the generator 1 and consequent speed of the motor 5, a control winding 38 arranged in opposition to the field winding 14 is provided. The winding 38 is energized from the direct-current output of the rectifier 34 and is under the control of a rheostat 39 mechanically connected for operation simultaneously with the rheostats 26 and 36. One terminal of the coil 38 is connected to the slide contact 40 of the rheostat 39. The other terminal of the coil 38 is connected to the tapped point 41 of the resistance in the rheostat 39. The resistance terminals 42 and 43 of the rheostat 39 are connected across the output terminal of the rectifier 34. For a low voltage output of the generator 1, the slide contact 40 will be adjacent the terminal 42 and energization of the coil 38 will be in a direction opposing the coil 14. Such energization of the coil 38 will be effective to reduce the residual magnetism in the frame of the generator 1 and thus enable the output voltage of the generator 1 to be reduced. Upon clockwise movement of the rheostats the slide contact 40 will operate to reduce the bucking effect of coil 38. When the slide contact 40 is over the terminal 41, the coil 38 will be deenergized and subsequent movement of the slide contact 40 in a clockwise direction will be effective to reverse the direction of current flow in the winding 38 so that the energization of such winding will assist the winding 14. In cases of generators in which there is sufficient residual magnetism to prevent reduction of the generator voltage below a given value, the winding 38 is essential in order to secure minimum speed of operation of the motor 5, and in such cases it cooperates with the dropping resistor 37 and coil 22 to reduce the minimum speed and thereby increase the overall speed range of the motor 5.

From the foregoing it will be apparent that there is provided an improved regulating system for controlling the voltage of a motor generator 7. It will further be apparent that the voltage regulating action provided by the pilot rectifier 23 connected in series opposition with respect to the output voltage of the generator and the consequent control action provided by the winding 21 on the reactor 20 is effective over the entire speed range of the drive provided by the generator 1 and motor 5. With respect to the control action provided by the winding 21, attention is particularly invited to the fact that the regulating action of such winding is a multiple of the electrical variation being regulated. It will further be apparent that the voltage regulating action is effective at the lower ranges of operating speed, and that the compensation for the IR drop provided by the resistor 37 and winding 22 enables a reduction of the lower limit of operating speed to thereby increase the overall speed range.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. In a regulating system for a direct current generator and a direct current motor having their armatures connected in a series circuit, a field winding for said generator, a rectifier having a direct current output circuit for energizing said field winding and an alternating current input circuit, a variable impedance reactor having a winding in series with said input circuit, a control winding on said reactor, a second rectifier having an alternating current input circuit and a direct current output circuit connected in series opposition across said generator for energizing said control winding, the energization of said control winding being effective to regulate the output of said generator by varying the impedance of the reactor and thereby the output of said first named rectifier to said field winding.

2. In a regulating system for a direct current generator and a direct current motor having their armatures connected in a series circuit, a field winding for said generator, a rectifier having a direct current output circuit for energizing said field winding and an alternating current input circuit, a variable impedance reactor having a winding in series with said input circuit, a control winding on said reactor, a second rectifier having an alternating current input circuit and a direct current output circuit connected in series opposition across said generator for energizing said control winding, the energization of said control winding being effective to regulate the output of said generator by varying the impedance of the reactor and thereby the output of said first named rectifier to said field winding, and a second control winding on said reactor energized in accordance with the load current flowing in said series circuit and cooperating with said first control winding to regulate the output of said generator to compensate for varying load conditions on said motor.

3. In a regulating system for a direct current generator and a direct current motor having their armatures connected in a series circuit, a field winding for said generator, a rectifier having a direct current output circuit for energizing said field winding and an alternating current input circuit, a variable impedance reactor having a winding in series with said input circuit, means for varying the impedance of said reactor to the current flowing in said input circuit series winding comprising a direct current control winding on said reactor, said control winding being energized in accordance with the current flowing in said series circuit and responsive to variations in such current to regulate the output of said generator to compensate for varying load conditions on said motor, and a second generator field winding arranged in opposing relation to said first field winding when the output voltage of said generator is at a low value.

4. A voltage regulator for a direct current generator having a field winding comprising a rectifier having a direct current output circuit for energizing said field winding and an alternating current input circuit, a variable impedance reactor having a winding in series with said input circuit, a control winding on said reactor, a second rectifier having an alternating current input circuit and a direct current output circuit connected in series opposition across said generator for energizing said control winding, the energization of said control winding being effective to regulate the output of said generator by varying the impedance of the reactor and thereby the output of said first named rectifier to said field winding.

5. A voltage regulator for a direct current generator having a field winding comprising a rectifier having a direct current output circuit for energizing said field winding and an alternating current input circuit, a variable impedance reactor having a winding in series with said input circuit, a control winding on said reactor, a second rectifier having an alternating current input circuit and a direct current output circuit connected in series opposition across said generator for energizing said control winding, the energization of said control winding being effective to regulate the output of said generator by varying the impedance of the reactor and thereby the output of said first named rectifier to said field winding, and a second control winding on said reactor energized in accordance with the generator load current and cooperating with said field control winding to regulate the output of said generator to compensate for varying load conditions on said generator.

6. A variable-voltage drive, comprising a motor, a generator electrically connected with said motor to provide variable voltage therefor and having control field means which include two excitation circuits poled for controlling said voltage in mutually differential relation to each other, direct-current supply means of normally constant voltage connected to one of said excitation circuits, a saturable reactor having an alternating-current main winding of controllable reactance and having control winding means for varying said reactance, alternating-current supply means, a rectifier having an input circuit connected to said alternating-current supply means in series with said main winding, said rectifier having an output excitation circuit connected to said other circuit, first circuit means connected with said motor to provide a variable control voltage dependent upon the motor speed, second circuit means connected to said current supply means to provide another control voltage of normally constant magnitude, said first and second circuit means being connected to said control winding means of said reactor and poled relative to each other so as to control said reactance in dependence upon the differential value of said control voltages for normally maintaining the motor speed at a value determined by said magnitude.

7. A field control system, comprising a dynamoelectric machine having control field means, two field-voltage sources connected to said field means in opposing relation to each other, one of said sources having normally constant voltage and having adjusting means for adjusting the magnitude of said constant voltage, a saturable reactor having a reactance winding connected between said field means and said other source and having control winding means for varying the voltage applied by said other source to said field winding means, a condition-responsive means for supplying variable control voltage connected with said control winding means, and voltage supply means of normally constant voltage connected with said control winding means in opposing relation to said condition-responsive means and having voltage-adjusting means for selectively adjusting the magnitude of said latter constant voltage.

8. A control system, comprising a dynamoelectric machine having two field excitation circuits opposingly related to each other, direct-current supply means of normally constant voltage connected to one of said excitation circuits and having first rheostat means for adjusting said constant voltage, alternating-current supply means, a saturable reactor, a rectifier having an input circuit series-connected with said reactor to said alternating-current supply means and having an output circuit connected to said other excitation circuit, said reactor having control winding means, condition-responsive current supply means connected to said control winding means for applying thereto a variable control voltage, and direct-current supply means of normally constant voltage connected to said control winding means in voltage opposition to said condition-responsive current supply means and having second rheostat means for adjusting said latter constant voltage, said first and second rheostat means being interconnected to adjust said two constant voltages in a given relation to each other.

9. A field control system, comprising a generator having two mutually opposing field windings, direct-current supply means of normally constant voltage connected to one of said field windings and having first rheostat means for adjusting said constant voltage, alternating-current supply means, a saturable reactor, a rectifier having an input circuit series-connected with said reactor to said alternating-current supply means and having an output circuit connected to said other field winding, said reactor having control winding means, direct-current supply means of normally constant voltage connected to said control winding means and having second rheostat means for adjusting said latter voltage, said first and second rheostat means being interconnected to adjust said two constant voltages in a given relation to each other, and variable-voltage supply means responsive to an operating condition of said generator and connected to said control winding means in opposed relation to said latter direct-current supply means for controlling said generator to maintain said condition constant at a value selected by said rheostat means.

WALDEMAR I. BENDZ.

REFERENCES CITED

The following references are of record in the file of this patent:

UNITED STATES PATENTS

| Number | Name | Date |
|---|---|---|
| 2,012,588 | Logan | Aug. 27, 1935 |
| 2,121,588 | Eames | June 21, 1938 |
| 2,286,370 | Miller | June 16, 1942 |